US010255140B2

United States Patent
Hadas et al.

(10) Patent No.: US 10,255,140 B2
(45) Date of Patent: *Apr. 9, 2019

(54) FULLY DISTRIBUTED INTELLIGENT REBUILD

(71) Applicant: International Business Machines Corporation, Armonk, NY (US)

(72) Inventors: David Hadas, Haifa (IL); Dmitry Sotnikov, Rishon Lezion (IL); Paula K. Ta-Shma, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,371

(22) Filed: Apr. 10, 2017

(65) Prior Publication Data

US 2017/0212813 A1 Jul. 27, 2017

Related U.S. Application Data

(63) Continuation of application No. 14/982,089, filed on Dec. 29, 2015, now Pat. No. 9,665,446.

(51) Int. Cl.
G06F 11/00 (2006.01)
G06F 11/14 (2006.01)
(Continued)

(52) U.S. Cl.
CPC ...... *G06F 11/1469* (2013.01); *G06F 11/1451* (2013.01); *G06F 17/30575* (2013.01);
(Continued)

(58) Field of Classification Search
CPC ..... G06F 17/30194–17/30215; G06F 11/1469; G06F 11/1451; G06F 2201/805;
(Continued)

(56) References Cited

U.S. PATENT DOCUMENTS 6,516,425 B1 2/2003 Belhadj et al.
7,305,579 B2 12/2007 Williams
(Continued)

FOREIGN PATENT DOCUMENTS

WO 2012142027 A3 10/2012

OTHER PUBLICATIONS

IBM Appendix P, List of patents and patent applications treated as related, Dated Apr. 10, 2017, 2 pages.
(Continued)

*Primary Examiner* — Jason B Bryan
(74) *Attorney, Agent, or Firm* — Alexander G. Jochym; Edward J. Wixted, III; Brian M. Restauro

(57) ABSTRACT

A globally distributed scan list is determined. A determination is made whether the first data replica in the first plurality of data stored on a first device is in sync with a second data replica in the second plurality of data on a second device. In response to determining that the first data replica is not in sync with the second data replica, the first data replica is added to an unsynced queue. The neighbor data of the first plurality of data is added to a suspect queue. The priority to check the neighbor data is increased if the neighbor data is already in the suspect queue. Unsynced neighbor data is added to the unsynced queue. The priority for recovery of the data in the unsynced queue is determined. The priority is based on the vulnerability of the data. A data replica in the unsynced queue is recovered.

20 Claims, 6 Drawing Sheets

(51) Int. Cl.
*H04L 29/08* (2006.01)
*G06F 17/30* (2006.01)

(52) U.S. Cl.
CPC ...... *H04L 67/1095* (2013.01); *H04L 67/1097* (2013.01); *G06F 2201/805* (2013.01); *G06F 2201/84* (2013.01)

(58) Field of Classification Search
CPC ............ G06F 2201/84; G06F 11/1658; G06F 11/1662; G06F 17/3057; H04L 67/1095–67/1097
See application file for complete search history.

(56) References Cited

U.S. PATENT DOCUMENTS

| | | | |
|---|---|---|---|
| 7,496,899 B2 | 2/2009 | Hill et al. | |
| 7,979,654 B2 * | 7/2011 | Stager | G06F 11/2082 707/624 |
| 8,019,728 B2 | 9/2011 | Bachwani et al. | |
| 8,275,939 B2 | 9/2012 | Gupta et al. | |
| 8,504,518 B1 | 8/2013 | Ghemawat et al. | |
| 8,555,109 B2 | 10/2013 | Dhuse et al. | |
| 8,706,755 B2 | 4/2014 | Patel et al. | |
| 8,880,799 B2 * | 11/2014 | Foster | G06F 11/1076 711/114 |
| 9,015,527 B2 | 4/2015 | Mohanta et al. | |
| 2004/0260873 A1 * | 12/2004 | Watanabe | G06F 11/2058 711/114 |
| 2007/0179993 A1 * | 8/2007 | Arruza | G06F 11/1612 |
| 2011/0069575 A1 | 3/2011 | Lee et al. | |
| 2011/0208994 A1 | 8/2011 | Chambliss et al. | |
| 2013/0262919 A1 | 10/2013 | Gao et al. | |
| 2013/0290775 A1 | 10/2013 | Tucek et al. | |
| 2014/0344646 A1 * | 11/2014 | Vas | H04L 67/1097 714/764 |
| 2014/0372384 A1 | 12/2014 | Long et al. | |
| 2015/0113324 A1 * | 4/2015 | Factor | H04L 67/1097 714/20 |

OTHER PUBLICATIONS

Ongaro, et al.; "Fast Crash Recovery in RAMCloud", SOSP '11, Oct. 23-26, 2011, Cascais, Portugal, Copyright © 2011, ACM, pp. 29-41.

Venkatesan, et al., "Reliability of Data Storage systems under Network Rebuild Bandwidth Constraints", 2012 IEEE 20th International Symposium on Modeling, Analysis and Simulation of computer Telecommunication Systems, pp. 189-197.

Xin, et al., "Evaluation of Distributed Recovery in Large-Scale Storage Systems", Proceedings of the 13th IEEE International Symposium on High Performance Distributed Computing, Honolulu, HI, Jun. 2004, 10 pages.

Yang, et al. "Protector: A Probabilistic Failure Detector for Cost-Effective Peer-to-Peer Storage", IEEE Transactions on Parallel and Distributed Systems, vol. 22; No. 9; Sep. 2011, pp. 1514-1527.

"Welcome to Swift's Documentation!", Openstack, swift 3.5.1. dev243 documentation, Printed: Aug. 4, 2015 3:21 PM, 3 Pages, <http://docs.openstack.org/developer/swift/>.

Hadas et al., "Fully Distributed Intelligent Rebuild", U.S. Appl. No. 14/982,089, filed Dec. 29, 2015, 39 pages.

* cited by examiner

FULLY DISTRIBUTED INTELLIGENT REBUILD

BACKGROUND OF THE INVENTION

The present invention relates generally to the field of data storage, and more particularly to reducing the probability of losing data while in storage.

A storage system is a collection of one or more servers that are interconnected by a network using a variety of connectivity protocols or media. The network connecting the storage system may be flat or hierarchical in design and the collection of servers may be physically ordered in the same computer rack, or distributed between different racks at different locations. Each server may be connected to a single or to multiple storage devices that can be represented by hard disk drives (HDD), solid-state drives (SSD), Flash Card or any other media that can be used for persistent storage of data.

Data reliability is crucial for distributed storage systems. Distributed storage systems typically use replication and erasure coding schemes to increase their resiliency to failures. Replication stores replicas (i.e., copies) of data across different failure domains. Erasure coding divides data into data and parity chunks, and distributes them across different failure domains. Based on the reliability protocols of a distributed storage system, any replica or portion of the erasure code that is unavailable or corrupted may be recovered from the remaining replicas or erasure code. The different failure domains can be defined by different storage devices, servers, racks, and even data centers. In distributed storage system, all the components are connected by a network, and can be any one server can be accessed by any other server.

SUMMARY

Embodiments of the present invention include a method, computer program product, and system for reducing the probability of losing data while in storage. In one embodiment, a globally distributed scan list is determined. The globally distributed scan list is a list of all of the data replicas stored on all of the devices in a distributed storage system. Each device in the distributed storage system monitors the portion of the globally distributed scan list which refers to the data stored on that device. A determination is made whether the first data replica in the first plurality of data stored on a first device is in sync with a second data replica in the second plurality of data on a second device. The second plurality of data is a replica of the first plurality of data. In response to determining that the first data replica is not in sync with the second data replica, the first data replica is added to an unsynced queue. The neighbor data of the first plurality of data is added to a suspect queue. The neighbor data is the first plurality of data excluding the first data replica. The priority to check the neighbor data is increased if the neighbor data is already in the suspect queue. Unsynced neighbor data is added to the unsynced queue. The priority for recovery of the data in the unsynced queue is determined. The priority is based on the vulnerability of the data. A data replica in the unsynced queue is recovered. The recovery is a replacement of the data replica with an intact replica of the data.

DETAILED DESCRIPTION

Figure 1:
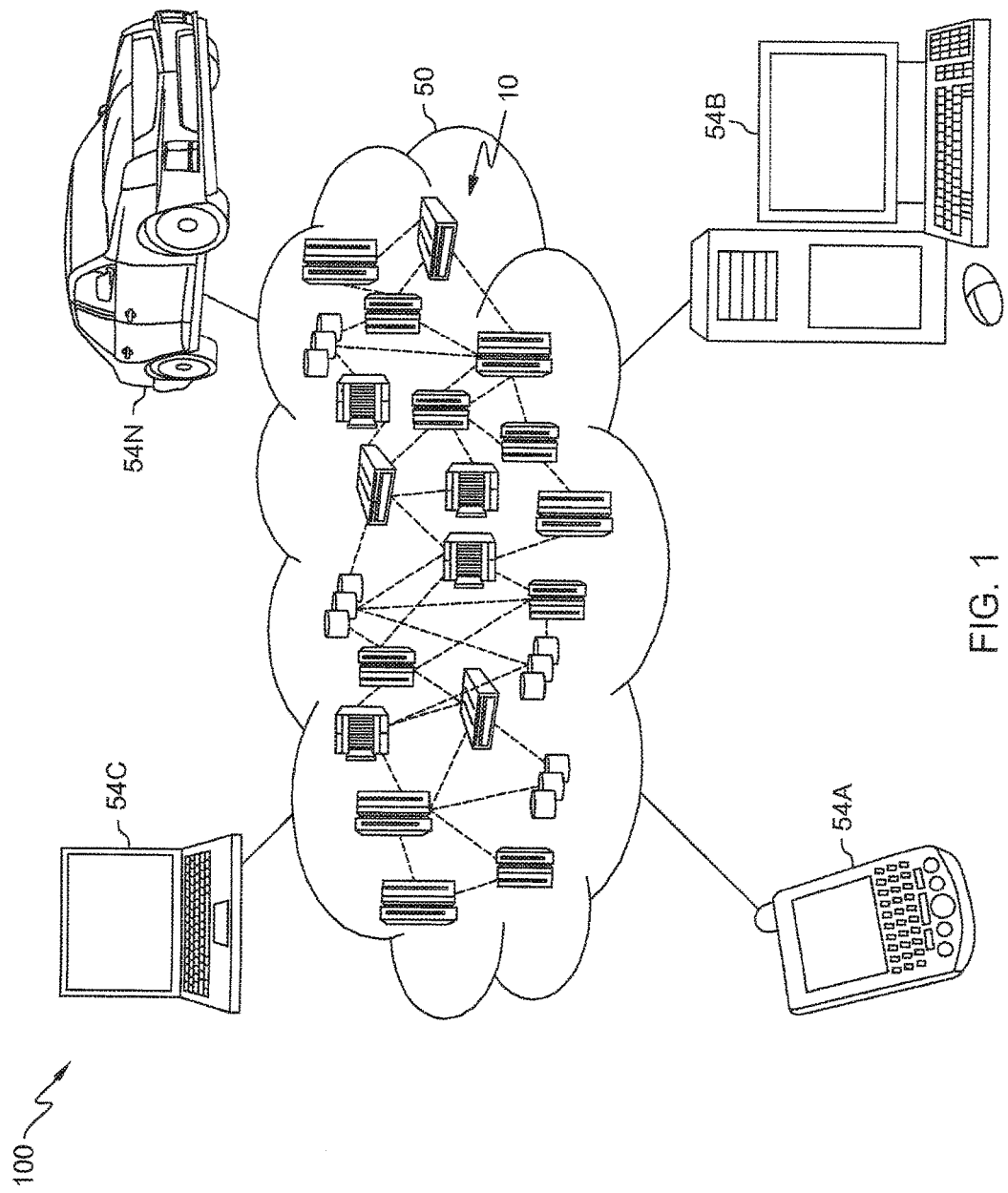
FIG. 1 depicts a cloud computing environment according to an embodiment of the present invention.

Some embodiments of the present invention recognize that losing data may have an adverse financial impact to a company. In addition to the raw cost in dollars, negative impact to the reputation of a company due to lost data may even be greater. Lost data may also have unfavorable ramifications on the reputation of a company, which may further impact the bottom line of the company in a negative manner. Some embodiments of the present invention recognize that the primary cause for lost data is a hardware malfunction. Other causes include the following: software corruption; human error; computer viruses; and natural disasters. To minimize the repercussions of lost data, loss prevention and data recovery are two important functions of an IT department.

Embodiments of the present invention recognize that there may be a method, computer program product, and system to recover corrupted and unavailable data via a fully distributed intelligent rebuild of the data. The method, computer program product, and system does not require a central agent responsible for (a) global knowledge of disk failures and for (b) orchestrating recovery of corrupted and unavailable data, which results in the elimination of a single point of failure. In addition, this embodiment better manages network partitions and connectivity problems.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
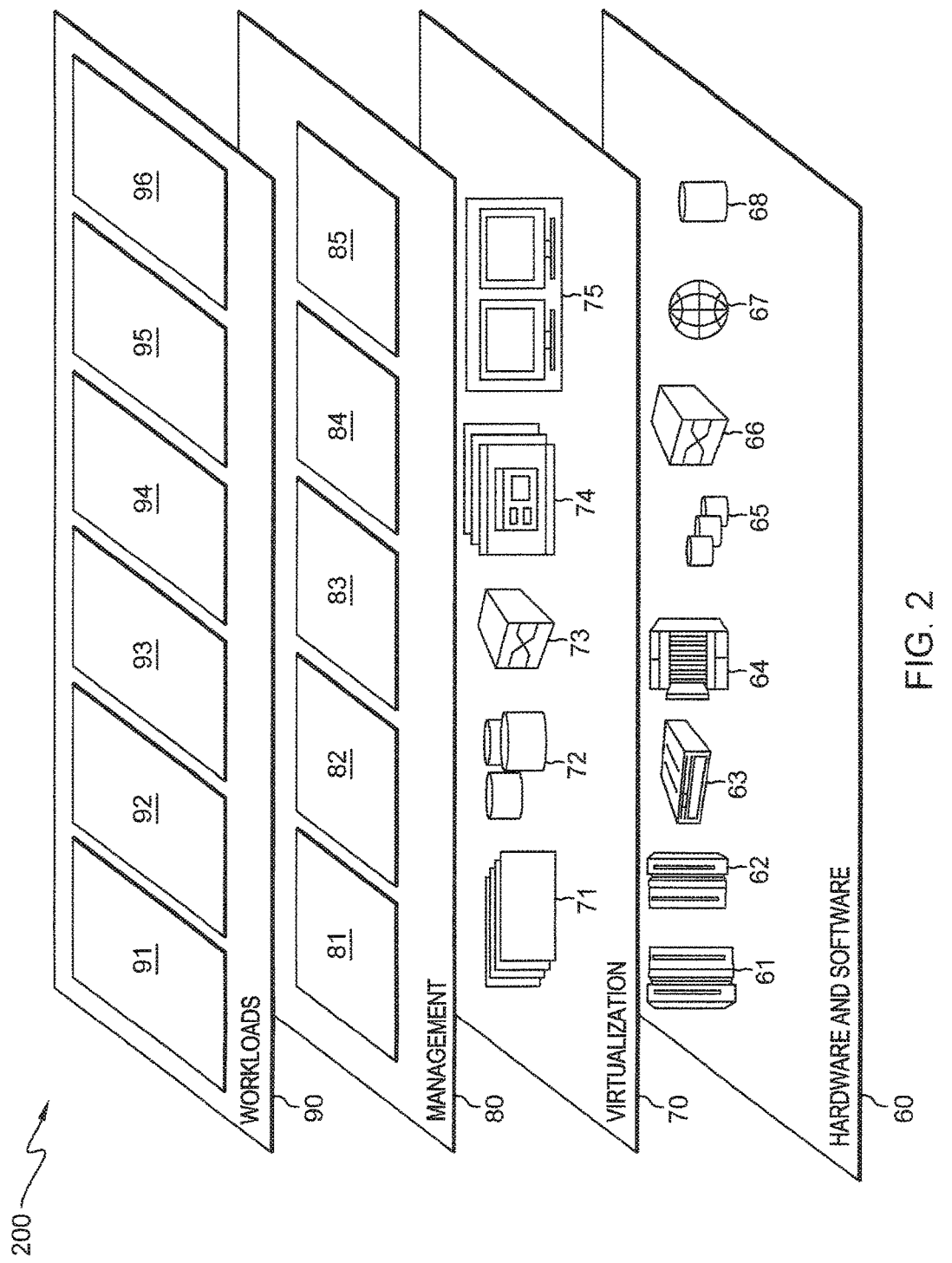
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recovery orchestrator 96.

Figure 3:
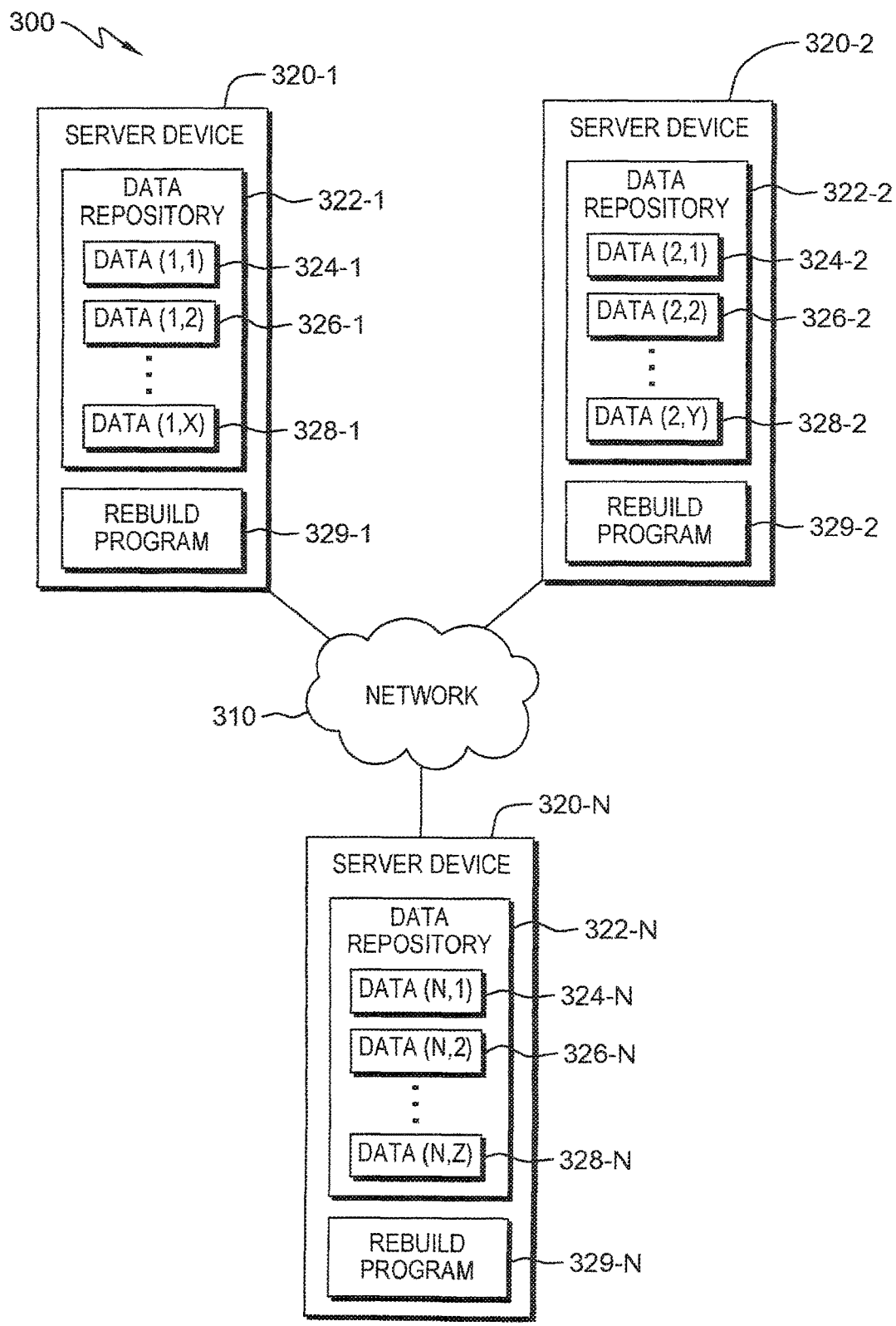
FIG. 3 is a functional block diagram of a computing environment, in accordance with an embodiment of the present invention.

FIG. 3 is a functional block diagram of a computing environment, generally designated 300, in accordance with an embodiment of the present invention. FIG. 3 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 300 includes any number of server device(s) 320 interconnected over network 310. It should be noted, for ease of discussion, server device(s) 320 is representative of server device 320-1, server device 320-2 and server device 320-N (where N is any number of server devices). In an example embodiment, utilizing network 310, server device 320-1 may communicate with any other server device 320. In example embodiments, computing environment 300 may include other computing devices not shown such as smartwatches, cell phones, smartphones, phablets, tablet computers, laptop computers, desktop computers, other computer servers or any other computer system known in the art, interconnected with any number of the server device(s) 320 over network 310.

In example embodiments, server device(s) 320 may connect to network 310 which enables server device(s) 320 to access other computing devices and/or data not directly stored on server device(s) 320. Network 310 may be a local area network (LAN), a telecommunications network, a wide area network (WAN) such as the Internet, or any combination of the three, and include wired, wireless or fiber optic connections. Network 310 may include one or more wired and/or wireless networks that are capable of receiving and transmitting data, voice, and/or video signals, including multimedia signals that include voice, data, and video information. In general, network 310 can be any combination of connections and protocols that will support communications between server device(s) 320 and other computing devices (not shown) within computing environment 300, in accordance with embodiments of the present invention.

In various embodiments of the present invention, server device(s) 320 may be a laptop, tablet or netbook personal computer (PC), a desktop computer, a personal digital assistant (PDA), a smartphone, or any other hand-held, programmable electronic device capable of communicating with any computing device within computing environment 300. In an embodiment, server device(s) 320 may be part of a distributed storage system. A distributed storage system is a network where data is stored on more than one device, often in a replicated manner. In certain embodiments, server device(s) 320 represents a computer system utilizing clustered computers and components (e.g., database server computers, application server computers, etc.) that act as a single pool of seamless resources when accessed by elements of computing environment 300. In general, server device(s) 320 is representative of any electronic device or combination of electronic devices capable of executing computer readable program instructions. Computing environment 300 may include any number of server device(s) 320. Server device(s) 320 may include components as depicted and described in further detail with respect to FIG. 7, in accordance with embodiments of the present invention.

Since all of the server device(s) 320 (i.e., server device 320-1, server device 320-2, and server device 320-N) are substantially equivalent, the term server device 320 is used throughout this document to represent any instance of server device(s) 320. Similarly, data repository 322 is used to represent data repository 322-1, data repository 322-2, and data repository 322-N. Lastly, rebuild program 329 will be used to represent rebuild program 329-1, rebuild program 329-2, and rebuild program 329-N. When needed, specific references may be used for clarity.

According to embodiments of the present invention, server device 320-1 includes data repository 322-1, data (1,1) 324-1, data (1,2) 326-1, data (1,X) 328-1, and rebuild program 329-1. In one embodiment of the present invention, server device 320-1 includes one data repository 322-1. In other embodiments, server device 320-1 may include any number of data repository 322-1. Data repository 322-1 may be storage that may be written to and/or read by rebuild program 329-1. In one embodiment, data repository 322-1 resides on server device 320-1. In other embodiments, data repository 322-1 may reside on any other device (not shown) in computing environment 300 or on another computing device accessible via network 310. In yet another embodiment, data repository 322-1 may represent multiple storage devices within server device 320-1. In various embodiments, data repository 322-1 may be implemented as a database, a collection of files, a knowledge base, an expert system, etc., residing on a database server, a hard disk drive, flash memory, and the like. In an embodiment of the present invention, data sent or received by rebuild program 329-1 may be stored to data repository 322-1. For example, data (2,2) 326-2 may be sent by rebuild program 329-2 to server device 320-1 for storage in data repository 322-1. Server device 320-2 and server device 320-N are substantially similar to server device 320-1.

According to embodiments of the present invention, the storage of data (1,1) 324-1, data (1,2) 326-1, and data (1,X) 328-1 is not fully mirrored across all server devices 320. In other words, each server device 320 includes some percentage of the available data but not one hundred percent of the available data. In one embodiment, server device 320-1 may include data (1,20) (not shown) through data (1,30) (not shown) while server device 320-2 may not include replicas of those data files. The data files are fully distributed across all of the available server devices 320.

In one embodiment, data (1,1) 324-1, data (1,2) 326-1, and data (1,X) 328-1 represent references to any type of data that may be stored to data repository 322 on server device 320-1. Types of data include the following: computer programs; documents (e.g., text documents, spreadsheets, presentation files, portable document format (PDF) files, etc.); audio/video files (e.g., music files, movie files, etc.); e-mail files; and the like. In general, data (1,1) 324-1, data (1,2) 326-1, and data (1,X) 328-1 may be any type of electronic data record that a user wants to save.

In an embodiment, rebuild program 329 may be a program, subprogram of a larger program, application, plurality of applications or mobile application software which orchestrates recovery of lost data. In an embodiment, lost data may mean missing, corrupted, inaccessible, and the like. Mobile application software, or an "app," is a computer program designed to run on smartphones, phablets, tablet computers and other mobile devices. In one embodiment, rebuild program 329 functions as a stand-alone program residing on server device 320. In another embodiment, rebuild program 329 may work in conjunction with other programs, applications, etc., found on server device 320 or in computing environment 300. In yet another embodiment, rebuild program 329 may be found on other computing devices (not shows) in computing environment 300 which are interconnected to server device 320 via network 310.

According to embodiments of the present invention, rebuild program 329 may include a scan list, a suspect queue, and an unsynced queue. In one embodiment, the unsynced queue is a repository for storing a reference to data determined not to be in sync with other data replicas and the suspect queue is a repository for storing a reference to data stored on the same failure domain or hardware (i.e., server, disk, etc.) that also stored data that has been determined not to be in sync with other data replicas. A failure domain is a group of servers which belong to the same network segment. In another embodiment, the scan list, suspect queue, and unsynced queue may be stored to data repository 322 in RAM (random access memory) for fast execution. In yet another embodiment, the scan list, suspect queue, and unsynced queue may be stored to another storage device (not shown), accessible over network 310, in computing environment 300. In yet another embodiment, the scan list, suspect queue, and unsynced queue may be stored to the same storage device. In yet another embodiment, the scan list, suspect queue, and unsynced queue may be stored to different storage device in any combination. In an embodiment, the scan list is comprised of the plurality of data replicas that will be monitored by rebuild program 329. The data replicas in the scan list are intact; i.e., are complete and not damaged or impaired in any way. In an embodiment, the suspect queue is comprised of data replicas that may not be in sync with other replicas of the same data. In an embodiment, data replicas from a failed server may be included in the suspect queue. In an embodiment, the unsynced queue is comprised of data replicas that are known to be out-of-sync with other replicas of the same data. In an embodiment, rebuild program 329 may recover out-of-sync data replicas based on erasure codes rather than replication. Erasure coding is a method of data protection in which data is broken into fragments or chunks, expanded and encoded with redundant data pieces and stored across a set of different locations. In one embodiment, resources of computing environment 300, used by rebuild program 329 in the orchestrated recovery of lost data, may be allocated as follows: 10% for monitoring the scan list; 70% for recovering data replicas found in the unsynced queue; and 20% for checking the suspect queue. A resource allocation as described, or a substantially similar allocation, allows for data replicas to be recovered while avoiding resource starvation (i.e., too many resources allocated to one function while not leaving sufficient resources for other functions to properly execute).

Figure 4:
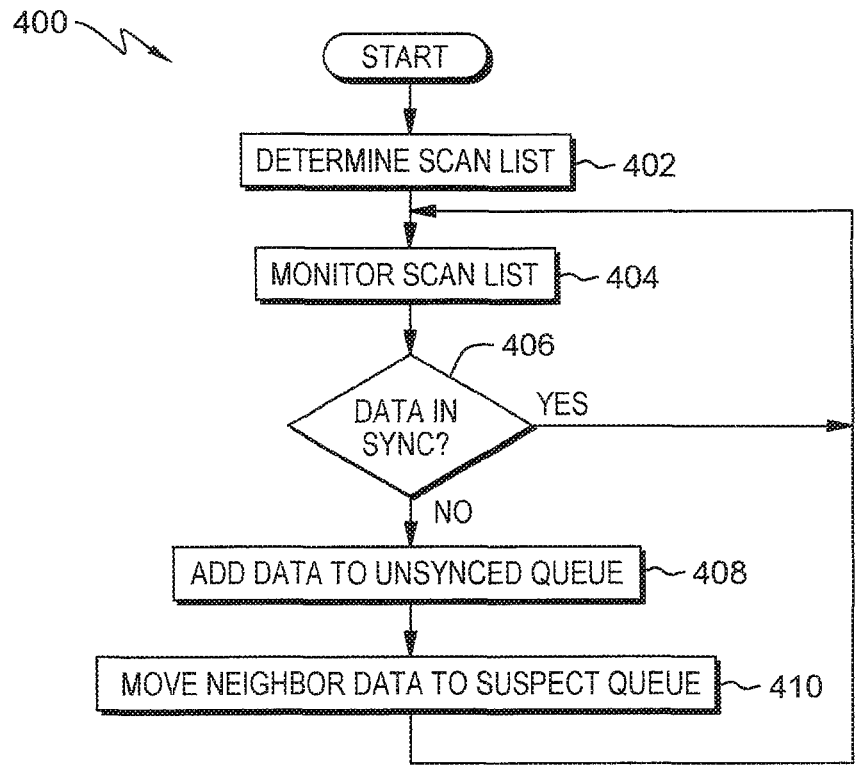
FIG. 4 is a flowchart depicting operational steps of a program that functions to reduce the probability of losing data while in storage, in accordance with an embodiment of the present invention.

FIG. 4 is a flowchart of workflow 400 depicting operational steps for reducing the probability of losing data while in storage. In an embodiment, workflow 400 represents the operational steps to execute recovery orchestrator 96 in workloads layer 90 in FIG. 2. In one embodiment, rebuild program 329 performs workflow 400. In an alternative embodiment, any other program, while working with rebuild program 329, may perform workflow 400. In an embodiment, the operational steps may be performed in any order. In an embodiment, the operational steps of workflow 400 occur continuously.

In an embodiment, rebuild program 329 determines the scan list (step 402). In other words, rebuild program 329-1 reads the plurality of data references (i.e., data (1,1) 324-1, data (1,2) 326-1, and data (1,X) 328-1) stored to server device 320-1 and determines the globally distributed scan list of data replicas or "jobs" that will be monitored by rebuild program 329-1 (i.e., the data references stored on server device 320-1). Similarly, rebuild program 329-2 reads the plurality of data references stored to server device 320-2 and rebuild program 329-N reads the plurality of data references stored to server device 320-N and in both instances determines the globally distributed scan list of data replicas that will be monitored by rebuild program 329. In an embodiment, the data replicas are also placed into a random order. In one embodiment, multiple replicas of the same data may be stored to one electronic device. In another embodiment, a single replica of the same piece of data is stored to multiple electronic devices. According to an embodiment of the present invention, three replicas of data (data (1,1) 324-1, data (1,2) 326-1, and data (1,X) 328-1), exist on three server devices (i.e., server device 320-1, server device 320-2, and server device 320-N). For example, a company maintains three replicas of their personnel file (i.e., P1, P2, and P3), three replicas of their salary file (i.e., S1, S2, and S3), and three replicas of their customer account (i.e., C1, C2, and C3). The replicas may be stored to three different electronic devices (i.e., E1, E2, and E3). The data replica allocation is as follows: P1, S1, and C1 are stored to E1; P2, S2, and C2 are stored to E2; and P3, S3, and C3 are stored to E3.

In an embodiment, rebuild program 329 monitors the scan list (step 404). In other words, rebuild program 329 monitors the content included in the individual data replicas found in the globally distributed scan list. In an embodiment, rebuild program 329-1 monitors the portion of the globally distributed scan list which refers to data stored on server device 320-1. In other words, each device in a distributed storage network monitors the portion of the globally distributed scan list which refers to data stored on that device. In an embodiment, rebuild program 329 also confirms that all data replicas are intact. An intact data replica is one that is complete and not damaged or impaired in any way. In an embodiment of the present invention, rebuild program 329 monitors the following replicas: data (1,1) 324-1, data (2,1) 324-2, data (1,2) 326-1, data (2,2) 326-2, data (1,X) 328-1, and data (2,Y) 328-2. For example, P1, P2, and P3 are monitored on E1, E2, and E3, respectively. Likewise, S1, S2, and S3 are monitored as are C1, C2, and C3. In this example, monitoring the personnel replicas may indicate that P1 and P2 may contain data of twenty employees and P3 may contain data of nineteen employees.

In an embodiment, rebuild program 329 determines whether the data replicas are in sync (decision step 406). In other words, rebuild program 329 monitors the data in the scan list to verify that all of the data replicas are 'in sync'; i.e., all copies are equivalent. In one embodiment (decision step 406, NO branch), rebuild program 329 determines that some data replicas are not in sync; therefore, rebuild program 329 proceeds to step 408 and adds the out-of-sync data replicas to the unsynced queue. In this embodiment, data (N,1) 324-N is determined to be out-of-sync. In another embodiment (decision step 406, YES branch), rebuild program 329 determines that the data replicas are in sync;

therefore, rebuild program 329 proceeds to step 404 and continues to monitor the scan list.

In an embodiment, rebuild program 329 adds data to the unsynced queue (step 408). In other words, responsive to determining that data is not in sync (decision step 406, NO branch), rebuild program 329 adds the unsynced data to the unsynced queue. In one embodiment, unsynced data is added to the unsynced queue. According to an embodiment of the present invention, rebuild program 329 adds the data found to be unsynced (i.e., data (N,1) 324-N) to the unsynced queue. For example, P3 is added to the unsynced queue.

In an embodiment, rebuild program 329 moves neighbor data to the suspect queue (step 410). In other words, the data that shares the hardware (i.e., server, disk, etc.) with the data determined to be unsynced is added to the suspect queue. The suspect queue is a repository of data replicas that are potentially not in sync with replicas of the same data. In an embodiment, responsive to determining that data (N,1) 324-N is out-of-sync, data (N,2) 326-N and data (N,Z) 328-N are added to the suspect queue. For example, S3 and C3 are added to the suspect queue because P3 was determined to be out-of-sync.

Figure 5:
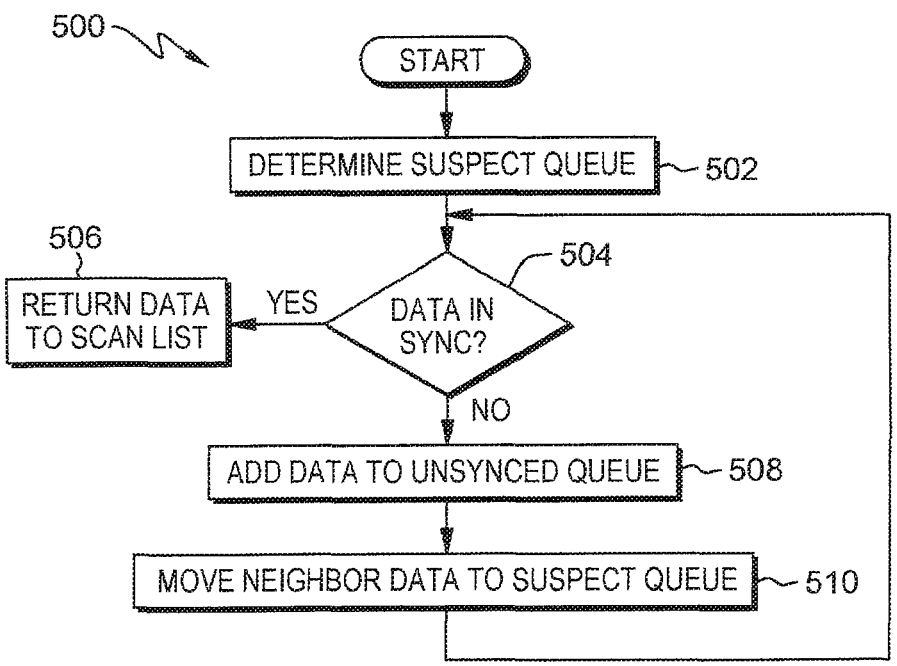
FIG. 5 is a flowchart depicting operational steps of a program that functions to reduce the probability of losing data while in storage, in accordance with an embodiment of the present invention.

FIG. 5 is a flowchart of workflow 500 depicting operational steps for reducing the probability of losing data while in storage. In an embodiment, workflow 500 represents the operational steps to execute recovery orchestrator 96 in workloads layer 90 in FIG. 2. In one embodiment, rebuild program 329 performs workflow 500. In an alternative embodiment, any other program, while working with rebuild program 329, may perform workflow 500. In an embodiment, the operational steps may be performed in any order. In an embodiment, the operational steps of workflow 500 occur continuously.

In an embodiment, rebuild program 329 determines the suspect queue (step 502). In other words, rebuild program 329 determines the suspect queue from step 410 of FIG. 4. According to an embodiment of the present invention, data (N,2) 326-N and data (N,Z) 328-N are stored in the suspect queue. For example, S3 and C3 are stored to the suspect queue.

In an embodiment, rebuild program 329 determines whether the data replicas are in sync (decision step 504). In other words, rebuild program 329 monitors the data in the suspect queue to verify that all of the data replicas are 'in sync'; i.e., all copies are equivalent. In one embodiment (decision step 504, NO branch), rebuild program 329 determines that some data replicas are not in sync; therefore, rebuild program 329 proceeds to step 508 and adds the out-of-sync data replicas to the unsynced queue. In this embodiment, data (N,Z) 328-N is determined to be out-of-sync. In another embodiment (decision step 504, YES branch), rebuild program 329 determines that the data replicas are in sync; therefore, rebuild program 329 proceeds to step 506 and returns the in sync data to a random location in the scan list for continued monitoring.

In an embodiment, rebuild program 329 returns data to the scan list (step 506). In other words, responsive to determining that data in the suspect queue is in sync (decision step 504, YES branch), rebuild program 329 returns the in sync data to a random location in the scan list for continued monitoring. In an embodiment, data (N,2) 326-N was determined to be in sync and is returned to the scan list in a random location. For example, S3 was determined to be in sync and it is returned to a random location in the scan list for continued monitoring.

In an embodiment, rebuild program 329 adds data to the unsynced queue (step 508). In other words, responsive to determining data in the suspect queue is out-of-sync (decision step 504, NO branch), rebuild program 329 adds the out-of-sync data to the unsynced queue. According to an embodiment of the present invention, data-N 328-N was determined to be out-of-sync and is added to the unsynced queue. For example, C3 was determined to be out-of-sync and is added to the unsynced queue.

In an embodiment, rebuild program 329 moves neighbor data to the suspect queue (step 510). In other words, the data that shares the hardware (i.e., server, disk, etc.) with the data determined to be unsynced is added to the suspect queue. If the data that shares hardware with the unsynced data is already in the suspect queue, the priority to check that data is increased. The suspect queue is a repository of data replicas that are potentially not in sync with replicas of the same data. In an embodiment, all other data stored to server device 320-N is added to the suspect queue. For example, any other data stored to E3 is added to the suspect queue.

Figure 6:
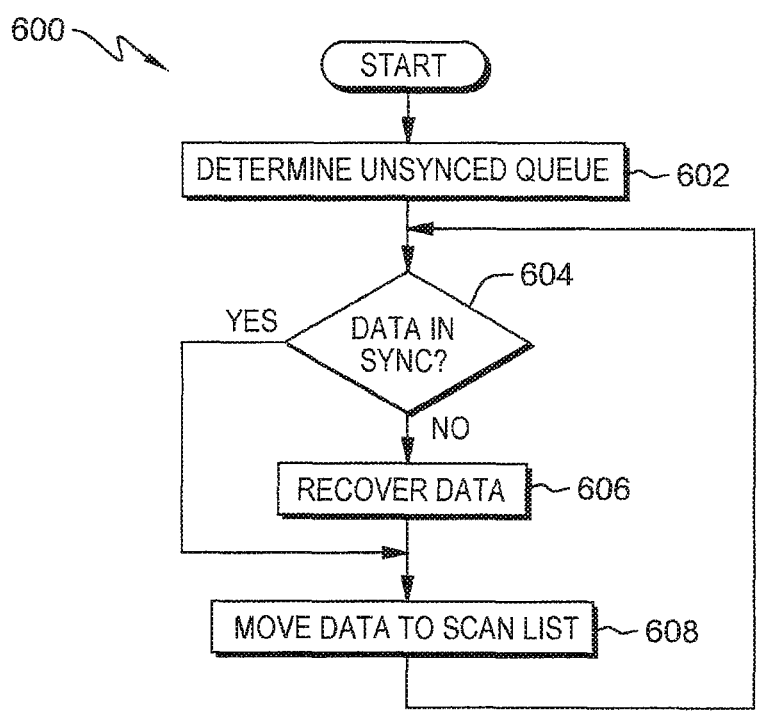
FIG. 6 is a flowchart depicting operational steps of a program that functions to reduce the probability of losing data while in storage, in accordance with an embodiment of the present invention.

FIG. 6 is a flowchart of workflow 600 depicting operational steps for reducing the probability of losing data while in storage. In an embodiment, workflow 600 represents the operational steps to execute recovery orchestrator 96 in workloads layer 90 in FIG. 2. In one embodiment, rebuild program 329 performs workflow 600. In an alternative embodiment, any other program, while working with rebuild program 329, may perform workflow 600. In an embodiment, the operational steps may be performed in any order. In an embodiment, the operational steps of workflow 600 occur continuously.

In an embodiment, rebuild program 329 determines the unsynced queue (step 602). In other words, rebuild program 329 determines the unsynced queue from step 408 of FIG. 4 and step 508 of FIG. 5. According to an embodiment of the present invention, data (N,1) 324-N and data (N,Z) 328-N are stored in the unsynced queue. For example, P3 and C3 are stored to the unsynced queue.

In an embodiment, rebuild program 329 determines whether the data replicas are in sync (decision step 604). In other words, rebuild program 329 monitors the data in the unsynced queue to verify that all of the data replicas are 'in sync'; i.e., all copies are equivalent. Even though the data is currently in the unsynced queue, some of the data may be in sync since the recovery operates in a fully distributed manner. Stated another way, server device 320-1 will add data to the unsynced queue when server device 320-1 has the most recent replica of the data and all other servers have outdated data. Server device 320-1 will attempt to synchronize the data by sending the most recent replica to any server with outdated data. In one embodiment (decision step 604, NO branch), rebuild program 329 determines that some data replicas are not in sync; therefore, rebuild program 329 proceeds to step 606 and recovers the unsynced data. In another embodiment (decision step 604, YES branch), rebuild program 329 determines that the data replicas are in sync; therefore, rebuild program 329 proceeds to step 608 and returns the in sync data to a random location in the scan list for continued monitoring.

In an embodiment, rebuild program 329 recovers data (step 606). In other words, responsive to determining that data is not in sync (decision step 604, NO branch), rebuild program 329 recovers the data. In an embodiment, recovery may be prioritized based on the vulnerability of the data. The vulnerability of the data may be based on one or more of the following: a number of remaining intact replicas, a number of remaining erasure code chunks, and a parameter of the device storing the intact replicas, wherein the parameter is at least one of the following: an age of the hardware, a number of read failures of the hardware, a temperature of the hardware, a number of shutdown cycles of the hardware, a number of read/write cycles of the hardware, a time from the last hardware failure, a number of random access memory errors of the hardware, any other SMART (Self-Monitoring Analysis and Reporting Technology) parameters of the hardware, speed of the hardware fans, access response time of the hardware, or life time (i.e., in-service duration) of the hardware. According to an embodiment of the present invention, the recovery may be achieved by replacing the unsynced data with an intact replica. In another embodiment, the recovery may use erasure codes in place of replication. In one embodiment, rebuild program 329 recovers data (N,1) 324-N and data (N,Z) 328-N found in the unsynced queue. For example, P3 and C3 are recovered.

In an embodiment, rebuild program 329 moves data to the scan list (step 608). In other words, rebuild program 329 returns the recovered data to a random location in the scan list for continued monitoring. In an embodiment of the present invention, data (N,1) 324-N and data (N,Z) 328-N are moved to a random location in the scan list for continued monitoring. For example, P3 and C3 are moved to a random location in the scan list for continued monitoring.

Figure 7:
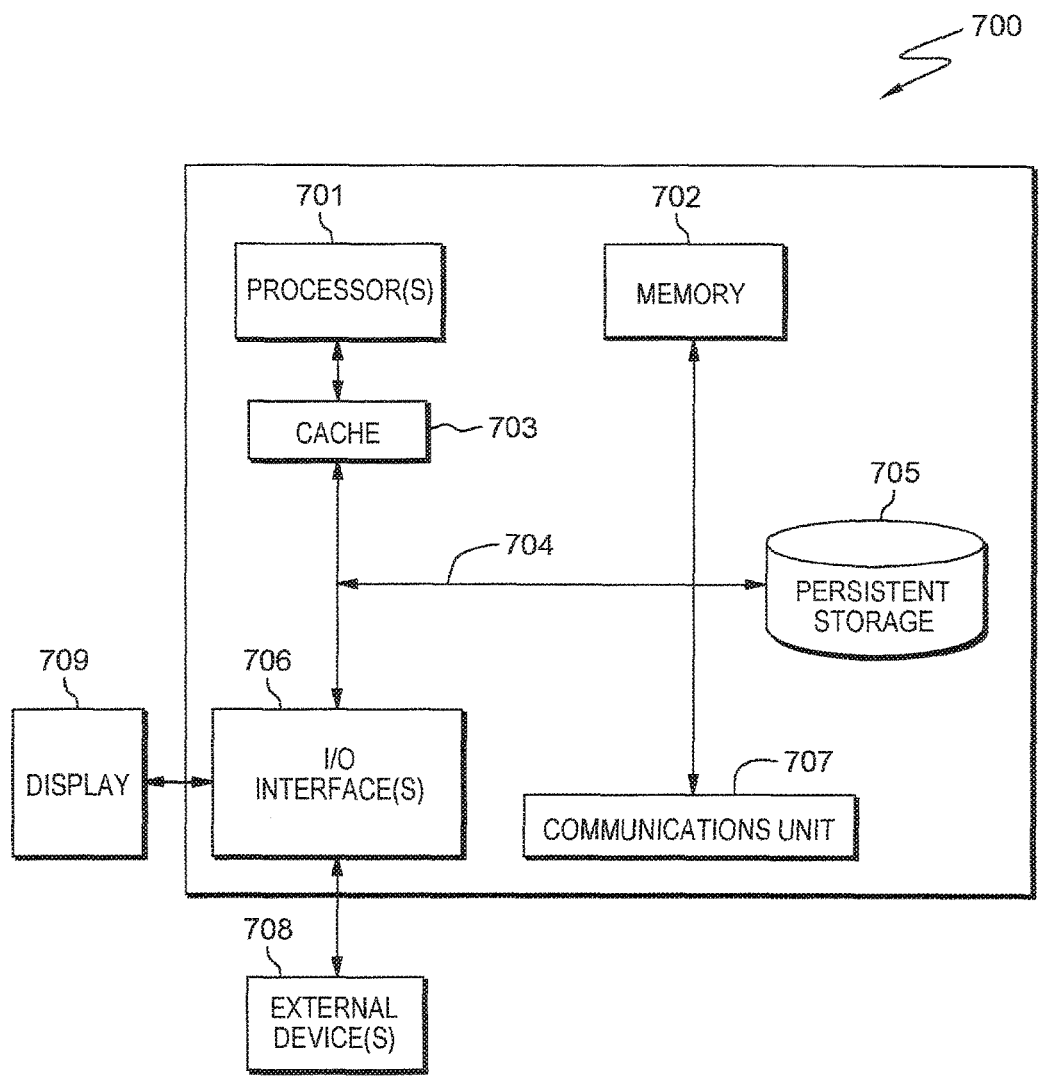
FIG. 7 depicts a block diagram of the components of the computing system of FIG. 3, in accordance with an embodiment of the present invention.

FIG. 7 depicts computer system 700 which is an example of a system that includes rebuild program 329. Computer system 700 includes processors 701, cache 703, memory 702, persistent storage 705, communications unit 707, input/output (I/O) interface(s) 706 and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processors 701 by holding recently accessed data, and data near recently accessed data, from memory 702.

Program instructions and data used to practice embodiments of the present invention may be stored in persistent storage 705 and in memory 702 for execution by one or more of the respective processors 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data used to practice embodiments of the present invention may be downloaded to persistent storage 705 through communications unit 707.

I/O interface(s) 706 allows for input and output of data with other devices that may be connected to each computer system. For example, I/O interface 706 may provide a connection to external devices 708 such as a keyboard, keypad, a touch screen, and/or some other suitable input device. External devices 708 can also include portable computer readable storage media such as, for example, thumb drives, portable optical or magnetic disks, and memory cards. Software and data used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for reducing the probability of losing data while in storage, the method comprising:
    determining, by one or more computer processors, that a first data replica in a first plurality of data stored on a first device of a distributed storage system is not in sync with a second data replica in a second plurality of data stored on a second device of the distributed storage system, wherein the second plurality of data is a replica of the first plurality of data;
    adding, by one or more computer processors, the first data replica in the first plurality of data to an unsynced queue and adding, by one or more computer processors, a neighbor data of the first plurality of data to a suspect queue, wherein the neighbor data is the first plurality of data not including the first data replica;
    increasing, by one or more computer processors, a priority to check the neighbor data if the neighbor data is already in the suspect queue;
    responsive to determining the neighbor data in the suspect queue is not in sync with any data replica stored to any device, adding, by one or more computer processors, the unsynced neighbor data to the unsynced queue;
    determining, by one or more computer processors, a priority for recovery, wherein the priority for recovery is based on a vulnerability of the data in the unsynced queue; and
    recovering, by one or more computer processors, at least one data replica in the unsynced queue, wherein the recovery is a replacement of the at least one data replica with an intact replica of the at least one replica.

2. The method of claim 1, further comprising:
    responsive to determining the first data replica in the first plurality of data is in sync with the second data replica in the second plurality of data, adding, by one or more computer processors, the first data replica in the first plurality of data to a random location in a globally distributed scan list.

3. The method of claim 1, wherein the vulnerability of data in the unsynced queue is based on one or more of the following: a number of remaining intact replicas, a number of erasure code chunks, and a parameter of a device storing the intact replicas, wherein the parameter is at least one of the following: an age of a hardware of the device, a number of read failures of the hardware, a temperature of the hardware, a number of shutdown cycles of the hardware, a number of read/write cycles of the hardware, a time from a last hardware failure, or a number of random access memory errors of the hardware.

4. The method of claim 1, further comprising:
moving, by one or more computer processors, the recovered at least one data replica to a random location in a globally distributed scan list.

5. The method of claim 1, further comprising:
determining, by one or more computer processors, whether a data replica in the suspect queue is in sync with any data replica stored to any server device; and
responsive to determining the data replica in the suspect queue is in sync with any data replica stored to any server device, adding, by one or more computer processors, the data replica to a random location in a globally distributed scan list.

6. The method of claim 1, wherein the unsynced queue is a repository for storing a reference to data determined not to be in sync with other data replicas and wherein the suspect queue is a repository for storing a reference to data stored on a same server that also stored data that has been determined not to be in sync with other data replicas.

7. The method of claim 3, wherein at least one of the erasure code chunks is a piece of data encoded with redundant data pieces stored in a different location and wherein an erasure code is used for recovery in place of replication.

8. A computer program product for reducing the probability of losing data while in storage, the computer program product comprising:
one or more computer readable storage media; and
program instructions stored on the one or more computer readable storage media, the program instructions comprising:
program instructions to determine that a first data replica in a first plurality of data stored on a first device of a distributed storage system is not in sync with a second data replica in a second plurality of data stored on a second device of the distributed storage system, wherein the second plurality of data is a replica of the first plurality of data;
program instructions to add the first data replica in the first plurality of data to an unsynced queue and adding, by one or more computer processors, a neighbor data of the first plurality of data to a suspect queue, wherein the neighbor data is the first plurality of data not including the first data replica;
program instructions to increase a priority to check the neighbor data if the neighbor data is already in the suspect queue;
responsive to determining the neighbor data in the suspect queue is not in sync with any data replica stored to any device, program instructions to add the unsynced neighbor data to the unsynced queue;
program instructions to determine a priority for recovery, wherein the priority for recovery is based on a vulnerability of the data in the unsynced queue; and
program instructions to recover at least one data replica in the unsynced queue, wherein the recovery is a replacement of the at least one data replica with an intact replica of the at least one replica.

9. The computer program product of claim 8, further comprising program instructions, stored on the one or more computer readable storage media, to:
responsive to determining the first data replica in the first plurality of data is in sync with the second data replica in the second plurality of data, add the first data replica in the first plurality of data to a random location in a globally distributed scan list.

10. The computer program product of claim 8, wherein the vulnerability of data in the unsynced queue is based on one or more of the following: a number of remaining intact replicas, a number of erasure code chunks, and a parameter of a device storing the intact replicas, wherein the parameter is at least one of the following: an age of a hardware of the device, a number of read failures of the hardware, a temperature of the hardware, a number of shutdown cycles of the hardware, a number of read/write cycles of the hardware, a time from a last hardware failure, or a number of random access memory errors of the hardware.

11. The computer program product of claim 8, further comprising program instructions, stored on the one or more computer readable storage media, to:
move the recovered at least one data replica to a random location in a globally distributed scan list.

12. The computer program product of claim 8, further comprising program instructions, stored on the one or more computer readable storage media, to:
determine whether a data replica in the suspect queue is in sync with any data replica stored to any server device; and
responsive to determining the data replica in the suspect queue is in sync with any data replica stored to any server device, add the data replica to a random location in a globally distributed scan list.

13. The computer program product of claim 8, wherein the unsynced queue is a repository for storing a reference to data determined not to be in sync with other data replicas and wherein the suspect queue is a repository for storing a reference to data stored on a same server that also stored data that has been determined not to be in sync with other data replicas.

14. The computer program product of claim 10, wherein at least one of the erasure code chunks is a piece of data encoded with redundant data pieces stored in a different location and wherein an erasure code is used for recovery in place of replication.

15. A computer system for reducing the probability of losing data while in storage, the computer system comprising:
one or more computer processors;
one or more computer readable storage media; and
program instructions stored on the one or more computer readable storage media for execution by at least one of the one or more computer processors, the program instructions comprising:
program instructions to determine that a first data replica in a first plurality of data stored on a first device of a distributed storage system is not in sync with a second data replica in a second plurality of data stored on a second device of the distributed storage system, wherein the second plurality of data is a replica of the first plurality of data;

program instructions to add the first data replica in the first plurality of data to an unsynced queue and adding, by one or more computer processors, a neighbor data of the first plurality of data to a suspect queue, wherein the neighbor data is the first plurality of data not including the first data replica;

program instructions to increase a priority to check the neighbor data if the neighbor data is already in the suspect queue;

responsive to determining the neighbor data in the suspect queue is not in sync with any data replica stored to any device, program instructions to add the unsynced neighbor data to the unsynced queue;

program instructions to determine a priority for recovery, wherein the priority for recovery is based on a vulnerability of the data in the unsynced queue; and program instructions to recover at least one data replica in the unsynced queue, wherein the recovery is a replacement of the at least one data replica with an intact replica of the at least one replica.

16. The computer system of claim 15, further comprising program instructions stored on the one or more computer readable storage media for execution by at least one of the one or more computer processors, to:

responsive to determining the first data replica in the first plurality of data is in sync with the second data replica in the second plurality of data, add the first data replica in the first plurality of data to a random location in a globally distributed scan list.

17. The computer system of claim 15, wherein the vulnerability of data in the unsynced queue is based on one or more of the following: a number of remaining intact replicas, a number of erasure code chunks, and a parameter of a device storing the intact replicas, wherein the parameter is at least one of the following: an age of a hardware of the device, a number of read failures of the hardware, a temperature of the hardware, a number of shutdown cycles of the hardware, a number of read/write cycles of the hardware, a time from a last hardware failure, or a number of random access memory errors of the hardware.

18. The computer system of claim 15, further comprising program instructions stored on the one or more computer readable storage media for execution by at least one of the one or more computer processors, to:

move the recovered at least one data replica to a random location in a globally distributed scan list.

19. The computer system of claim 15, further comprising program instructions stored on the one or more computer readable storage media for execution by at least one of the one or more computer processors, to:

determine whether a data replica in the suspect queue is in sync with any data replica stored to any server device; and responsive to determining the data replica in the suspect queue is in sync with any data replica stored to any server device, add the data replica to a random location in a globally distributed scan list.

20. The computer system of claim 15, wherein the unsynced queue is a repository for storing a reference to data determined not to be in sync with other data replicas and wherein the suspect queue is a repository for storing a reference to data stored on a same server that also stored data that has been determined not to be in sync with other data replicas.

* * * * *